(12) United States Patent
Hall et al.

(10) Patent No.: US 8,152,218 B2
(45) Date of Patent: Apr. 10, 2012

(54) INTEGRAL PELVIC IMPACT ENERGY-ABSORBING PRE-CRUSH PROTECTIVE CONSTRUCTION FOR VEHICLE DOOR

(75) Inventors: Ian Brewster Hall, Ann Arbor, MI (US); Zhibing Deng, Northville, MI (US); Rabin Bhojan, Northville, MI (US); John Pinkerton, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/119,542

(22) Filed: May 13, 2008

(65) Prior Publication Data

US 2009/0284041 A1    Nov. 19, 2009

(51) Int. Cl.
B60J 5/00    (2006.01)
(52) U.S. Cl. .................................................. 296/146.6
(58) Field of Classification Search ............... 296/146.6, 296/187.05, 146.7, 203.03, 187.09, 153, 296/187.12
See application file for complete search history.

(56) References Cited

U.S. PATENT DOCUMENTS

| | | | | |
|---|---|---|---|---|
| 3,808,743 A * | 5/1974 | Renner et al. | | 49/502 |
| 3,964,208 A * | 6/1976 | Renner et al. | | 49/502 |
| 3,989,275 A * | 11/1976 | Finch et al. | | 280/751 |
| 4,272,103 A * | 6/1981 | Schmid et al. | | 280/751 |
| 4,769,951 A * | 9/1988 | Kaaden | | 49/502 |
| 4,783,114 A * | 11/1988 | Welch | | 296/153 |
| 4,786,100 A * | 11/1988 | Kleemann et al. | | 296/146.6 |
| 5,066,064 A * | 11/1991 | Garnweidner | | 296/146.6 |
| 5,141,279 A * | 8/1992 | Weller | | 296/146.7 |
| 5,395,135 A * | 3/1995 | Lim et al. | | 280/751 |
| 5,435,619 A * | 7/1995 | Nakae et al. | | 296/187.12 |
| 5,482,344 A * | 1/1996 | Walker et al. | | 296/39.1 |
| 5,542,738 A * | 8/1996 | Walker et al. | | 296/187.05 |
| 5,573,298 A * | 11/1996 | Walker et al. | | 296/187.12 |
| 5,580,119 A * | 12/1996 | Uchida et al. | | 296/146.6 |
| 5,588,692 A * | 12/1996 | Gandhi et al. | | 296/146.7 |
| 5,595,415 A * | 1/1997 | Beaulat | | 296/39.1 |
| 5,603,548 A * | 2/1997 | Gandhi et al. | | 296/146.7 |
| 5,707,098 A * | 1/1998 | Uchida et al. | | 296/146.6 |
| 5,716,093 A * | 2/1998 | Sadr | | 296/146.6 |
| 5,749,600 A * | 5/1998 | Yamada et al. | | 280/751 |
| 5,857,702 A * | 1/1999 | Suga et al. | | 280/751 |
| 5,865,496 A * | 2/1999 | Odan et al. | | 296/146.6 |
| 5,927,020 A * | 7/1999 | Kobrehel | | 49/502 |
| 5,934,730 A * | 8/1999 | Yagishita et al. | | 296/39.1 |
| 5,934,743 A * | 8/1999 | Nohr et al. | | 296/187.06 |
| 6,036,251 A * | 3/2000 | Yagishita et al. | | 296/39.1 |
| 6,196,621 B1 * | 3/2001 | VanAssche et al. | | 296/187.09 |
| 6,203,096 B1 * | 3/2001 | Noda et al. | | 296/146.6 |
| 6,302,472 B1 * | 10/2001 | Rahmstorf et al. | | 296/146.5 |
| 6,474,721 B2 * | 11/2002 | Nishikawa et al. | | 296/146.6 |
| 6,568,743 B1 * | 5/2003 | Jayasuriya et al. | | 296/153 |
| 6,631,940 B2 * | 10/2003 | Dauvergne et al. | | 296/146.6 |
| 6,688,671 B2 * | 2/2004 | Fukutomi | | 296/146.6 |
| 6,742,830 B2 * | 6/2004 | Zimmerman et al. | | 296/146.7 |
| 6,808,224 B1 * | 10/2004 | Obara | | 296/146.5 |

(Continued)

*Primary Examiner* — Kiran B. Patel
(74) *Attorney, Agent, or Firm* — Shook, Hardy & Bacon LLP (57) ABSTRACT

A door trim substrate having a construction which includes, in combination, an energy-absorbing pre-crush protective portion and a pelvic bolster portion is provided for use in a vehicle. The pre-crush protective portion is configured so as to protect the pelvic bolster portion from pre-crush in a vehicle side-impact event. The pre-crush portion is defined by a rib cassette structure which is preferably integrally molded into the door trim substrate below the pelvic bolster portion.

9 Claims, 11 Drawing Sheets

U.S. PATENT DOCUMENTS

| | | | |
|---|---|---|---|
| 6,851,740 B1 * | 2/2005 | Peng | 296/187.12 |
| 6,890,018 B1 * | 5/2005 | Koa et al. | 296/146.5 |
| 6,955,391 B1 * | 10/2005 | Peng | 296/146.6 |
| 7,014,249 B2 * | 3/2006 | Karuppaswamy et al. | 296/146.6 |
| 7,040,688 B2 * | 5/2006 | White et al. | 296/146.6 |
| 7,198,319 B2 * | 4/2007 | Schroder et al. | 296/146.7 |
| 7,334,813 B2 * | 2/2008 | Mellor | 280/730.2 |
| 7,357,444 B2 * | 4/2008 | Cowelchuk et al. | 296/187.05 |
| 7,441,826 B2 * | 10/2008 | Frank | 296/146.6 |
| 2009/0134660 A1 * | 5/2009 | Pinkerton et al. | 296/146.7 |
| 2009/0152848 A1 * | 6/2009 | Sadr et al. | 280/730.2 |
| 2009/0152849 A1 * | 6/2009 | Saraf et al. | 280/730.2 |

* cited by examiner

INTEGRAL PELVIC IMPACT ENERGY-ABSORBING PRE-CRUSH PROTECTIVE CONSTRUCTION FOR VEHICLE DOOR

TECHNICAL FIELD

The present invention relates generally to collapsible door structures for use with vehicle doors. More particularly, the present invention relates to a door trim substrate having an energy-absorbing pre-crush protector portion and a pelvic bolster portion. The pre-crush protector portion is configured so as to protect the pelvic bolster portion from pre-crush in a vehicle side-impact event.

BACKGROUND OF THE INVENTION

Side impact events in vehicles have been identified as one of the top priorities for both research and regulation with government requirements continuing to become more stringent. As a result of the multiple test dummy sizes, the pelvic bolster stiffness target must be well maintained in all side impact scenarios. Particularly, in a side impact event, the pelvic bolster may deform prior to occupant contact (so-called "pre-crush") as the bolster is constrained between the door trim panel and the intruding door sheetmetal. Data illustrate that the amount of deformation of the pelvic bolster varies with different test modes and occupant sizes. These variations alter the targeted pelvic bolster stiffness and have great effect on occupant performance as seen in many tests. Since the pelvic bolster stiffness is typically optimized as contact stiffness with the test dummies, protection of the pelvic bolster from pre-crush becomes critical for occupant performance in side impact.

Accordingly, as in so many areas of vehicle technology, there is room in the art of vehicle door design for an alternative configuration to known pelvic bolster structures which provides effective protection that can be adapted to a variety of shapes while maintaining relatively low manufacturing and assembly costs.

SUMMARY OF THE INVENTION

The present invention generally provides a door assembly in which the energy absorption characteristics are integrated in the door trim substrate by providing a door substrate having an energy-absorbing pre-crush protective portion and a pelvic bolster portion. The pre-crush protective portion is configured so as to protect the pelvic bolster portion from pre-crush in a vehicle side-impact event. More particularly, the door assembly includes an outer sheetmetal, an inner door panel disposed adjacent said outer sheetmetal, a bolster portion disposed adjacent the inner door panel, and a pre-crush protector portion disposed adjacent the bolster portion. The pre-crush protector portion is deeper than the bolster portion with the additional depth generally extending vehicle-outward toward the outer sheetmetal. The bolster portion and the pre-crush protector portion may be integrally formed from a polymerizable material. In the event of a side-impact event, the pre-crush protector portion would absorb the impact energy, thus leaving intact the bolster portion to absorb energy from the occupant as the occupant intrudes upon the bolster portion.

The door substrate having the pelvic bolster portion and the pre-crush protector portion may be formed from any of a variety of polymerizable materials, but is preferably formed from molded polypropylene (PP). This arrangement is preferable over, for example, foam, insofar as an integrally-molded substrate of this configuration is able to generate load more quickly than foam. Accordingly, higher forces earlier in the event allow for a reduction in peak loads later. In addition, the lateral stiffness of both the bolster portion and the pre-crush protector portion may be designed to vary significantly over the surface of the bolster so that occupants of different sizes, who would sit in different locations in the vehicle, would see different loads. Simulations have shown that the component design of the disclosed invention meets the requisite loading curves.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

In the following figures, the same reference numerals will be used to refer to the same components. In the following description, various operating parameters and components are described for different constructed embodiments. These specific parameters and components are included as examples and are not meant to be limiting.

Figure 1:
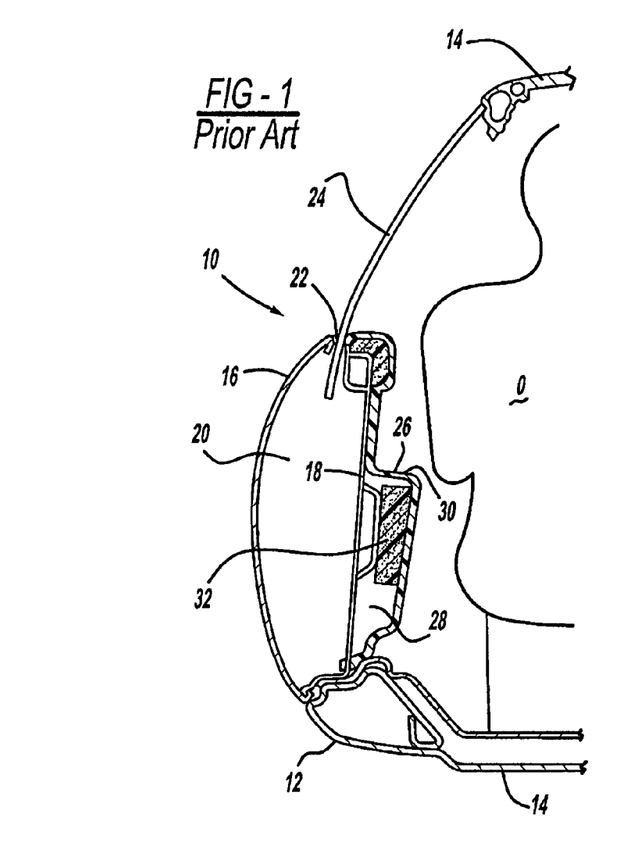
FIG. 1 illustrates a sectional view of a door assembly of the known art shown prior to an impact event.

With reference to FIG. 1, a sectional view of a door assembly of the known art, generally illustrated as 10, is shown prior to an impact event, or at T1. The door assembly 10 is illustrated in operational relationship with a rocker panel 12 of a vehicle 14. It should be appreciated that the rocker panel 12 is stationary and connected to the structure of the vehicle 14 and the vehicle door 10 is movable and connected to the remaining structure of the vehicle 14 as is known in the art.

As seen in FIG. 1, the vehicle door 10 includes an outer panel 16 and an inner panel, generally indicated as 18, joined together in conventional fashion to form a space 20 therebetween. The door 10 also includes an aperture 22 at an upper end for receiving a window 24, which may move in and out of the space 20. A window regulator device, a door latch, a guard beam, and other components (not shown) of a vehicle door as known in the art may also be housed entirely or substantially within the space 20.

A door trim panel 26 is mounted on the inner panel 18 to form a space 28 therebetween. A window regulator device, a door latch, a guard beam, and other components (not shown) of a vehicle door as known in the art may also be housed entirely or substantially within the space 28. The door trim panel 26 includes an arm rest 30 generally facing the occupant seating area. The trim panel 26 is conventionally fixedly secured to the inner panel 18 by fasteners as are known in the art, such as screw and clip fasteners.

As is known in the art, a pelvic bolster 32 is provided within the space 28 defined between the door trim panel 26 and the inner panel 18. According to known arrangements, the known pelvic bolsters are foam material blocks that are polyurethane foam, expanded polypropylene, and the like. Known pelvic bolster designs vary in shapes and thicknesses, thus the pelvic bolster 32 is provided for illustrative purposes only.

Figure 2:
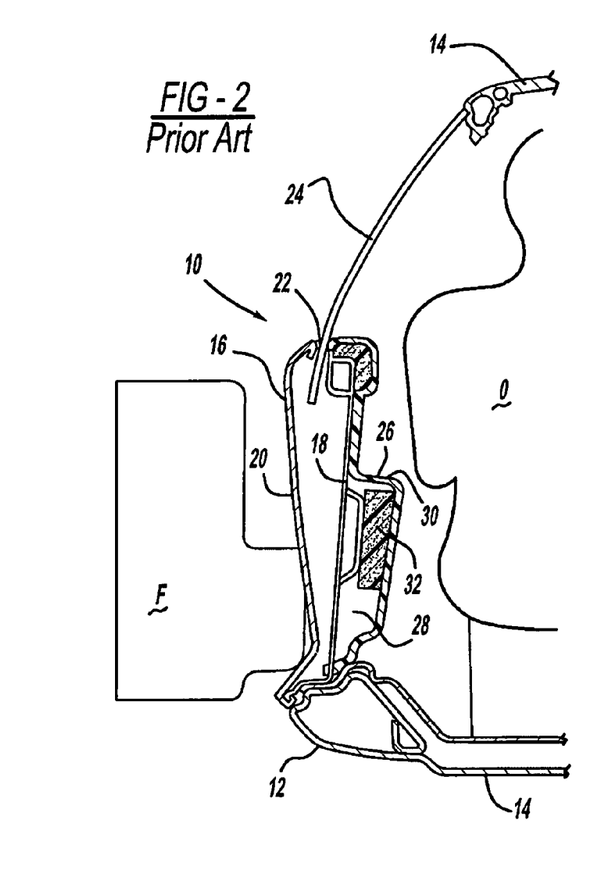
FIG. 2 illustrates a view of the door assembly of FIG. 1 but showing the assembly initially after an impact event.

In the early stages of an impact event at T2, as illustrated in FIG. 2, an impacting force, generally illustrated as F, presses the outer panel 16 vehicle-inward. At this stage of the impact event only the outer panel 16 is changed, while a vehicle occupant O is not directly impacted.

Figure 3:
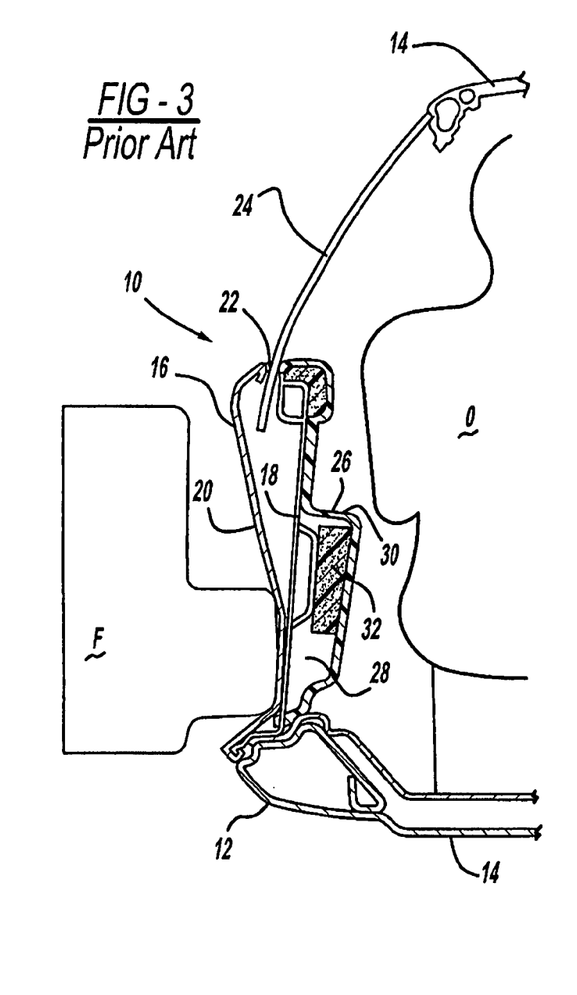
FIG. 3 illustrates a view of the door assembly of FIG. 2 but showing the assembly later after the impact event.

At T3, as shown in FIG. 3, the impacting force F forces the outer panel 16 vehicle-inward substantially contacting and impacting upon the inner panel 18, which itself begins to deform.

Figure 4:
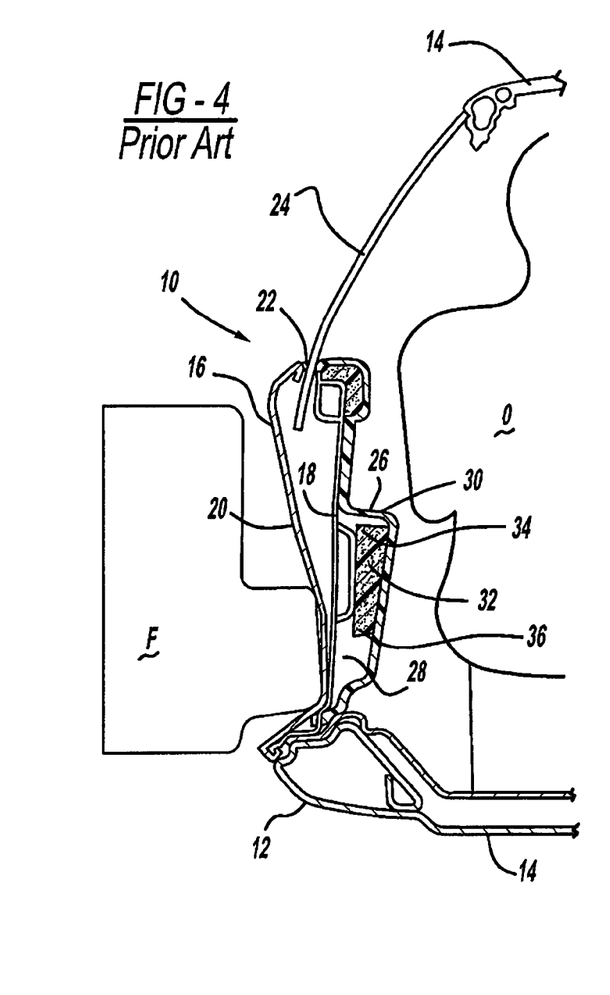
FIG. 4 illustrates a view of the door assembly of FIG. 3 but showing the assembly still later after the impact event.

At T4, as shown in FIG. 4, the impacting force F has now moved both the outer panel 16 and the inner panel 18 vehicle-inward, impacting upon the bolster 32 which begins to deform, constrained as it is between the intruding panels 16 and 18 and the door trim panel 26. Extending from the upper and lower ends of the bolster 32 are areas 34 and 36 shown for illustrative purposes to demonstrate how the operative thickness of the bolster 32 is compromised prior to contact with the occupant O. It is to be understood that the amount of deformation of the bolster 32 varies under different circumstances.

Figure 5:
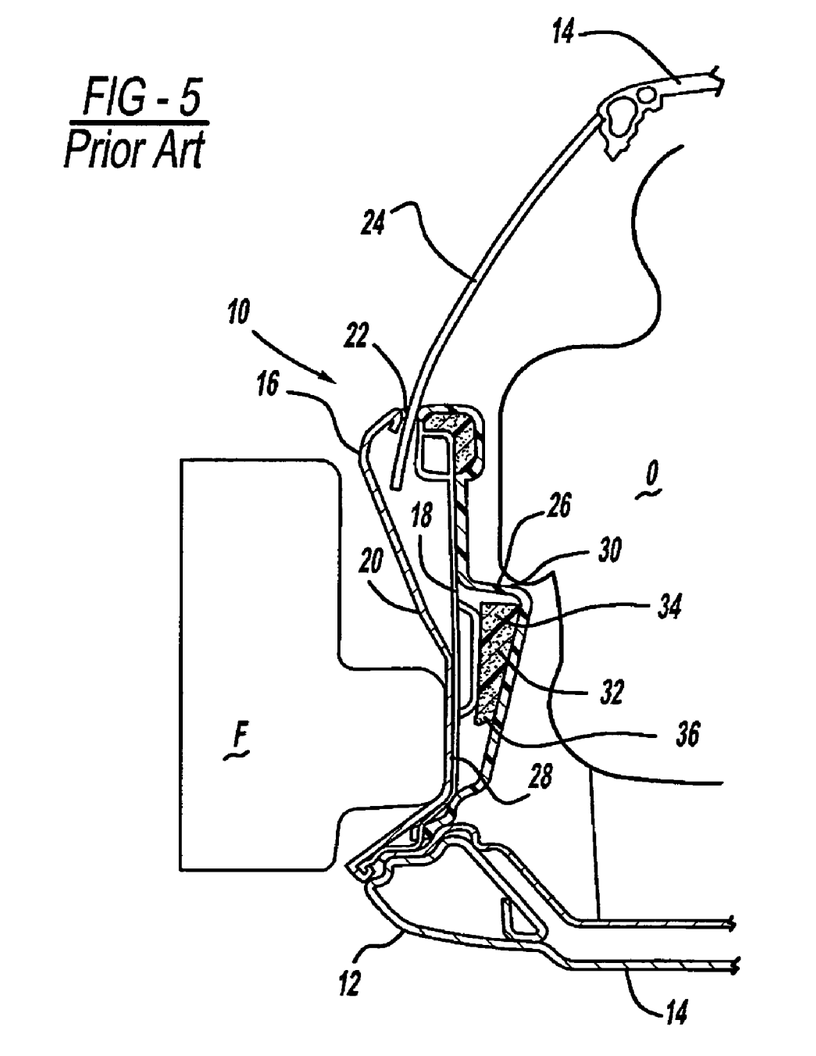
FIG. 5 illustrates a view of the door assembly of FIG. 4 but showing the assembly even later after the impact event.

The unsatisfactory result from a pre-crushed pelvic bolster is demonstrated in FIG. 5, which shows the arrangement at T5 in which the outer panel 16, the inner panel 18, the now-deformed bolster 32, and the door trim panel 26 have been moved vehicle-inward in actual or in near contact with the occupant O. However, as the bolster 32 has already been fully or substantially crushed by the movement of the force F, the illustrated arrangement can provide less than an optimal occupant performance in a side impact event.

By providing an arrangement whereby an energy-absorbing pre-crush protector portion is provided in conjunction with a pelvic bolster portion, the desired optimal occupant performance in a side impact event can be achieved. FIGS. 6 through 12 illustrate this arrangement which defines the disclosed invention.

Figure 6:
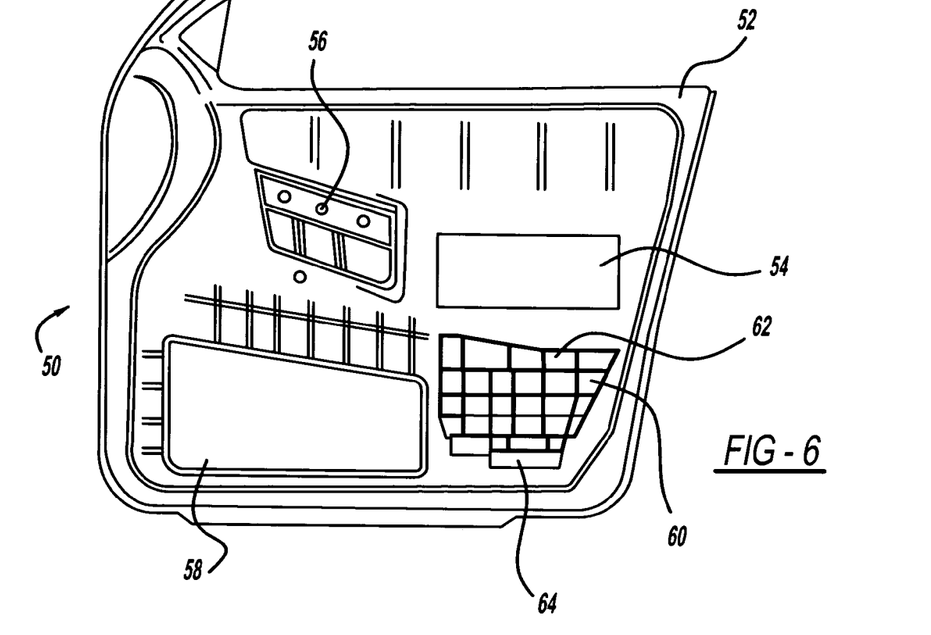
FIG. 6 illustrates the vehicle door substrate with a construction which is a combination pelvic bolster portion and energy-absorbing pre-crush protector portion.

With reference to FIG. 6, a vehicle door 50 is shown. The interior panel has been removed to illustrate a door trim substrate 52. As is known in the art, the door trim substrate 52 includes a variety of supporting structures, including, for example, a first armrest support structure 54 and a second armrest support structure 56. It is to be understood that any of a great variety of support structures may be provided in a variety of different configurations.

Figure 7:
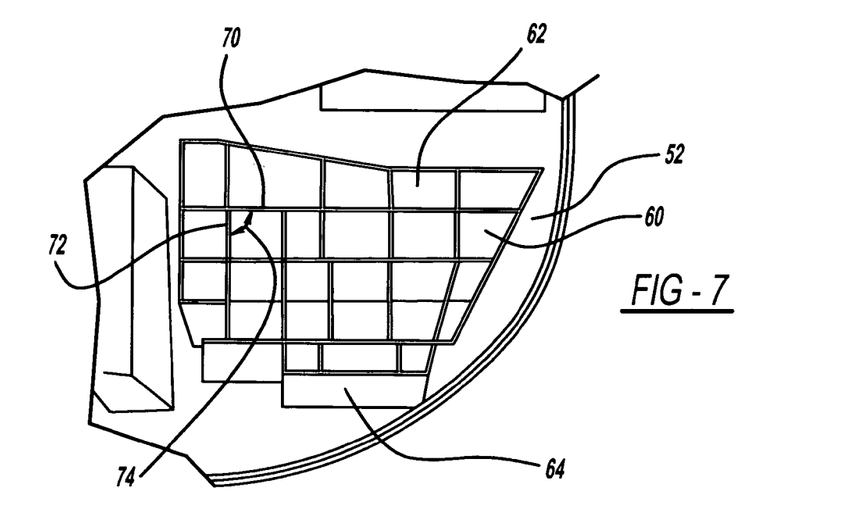
FIG. 7 illustrates a detailed view of the view of combination pelvic bolster portion and energy-absorbing pre-crush protector portion construction of FIG. 6.

A door pocket closeout 58 is formed on the door trim substrate 52 as is known in the art. Adjacent the door pocket closeout 58 is a pelvic impact energy-absorbing construction 60 which includes a pelvic bolster portion 62 and an energy-absorbing pre-crush protector portion 64. The construction 60 is preferably, but not absolutely, integral with the door trim substrate 52. A more detailed view of the construction 60 is illustrated in FIG. 7.

As illustrated, the pelvic bolster portion 62 is positioned generally above the energy-absorbing pre-crush protector portion 64. Each of the pelvic bolster portion 62 and the energy-absorbing pre-crush protector portion 64 define distinct sections of the construction 60. Both the pelvic bolster portion 62 and the energy-absorbing pre-crush protector portion 64 are preferably formed integrally as the construction 60 as illustrated, although this may not necessarily be the case and the pelvic bolster portion 62 may be formed separate from the energy-absorbing pre-crush protector portion 64. In addition, it is preferred that both the pelvic bolster portion 62 and the energy-absorbing pre-crush protector portion 64 be composed of a polymerized material having the illustrated rib cassette configuration comprising a plurality of intersecting walls 70 and 72 which in some instances as illustrated define right angles 74. However, it is to be understood that the pelvic bolster portion 62 may be formed from other energy absorbing materials such as, for example, polyurethane foam, while the row or rows of ribs that define the energy-absorbing pre-crush protector portion 64 would be used as the in-molded pre-crush protector. According to this arrangement, the pelvic bolster portion 62 is configured to provide a certain desired and selected loading curve, while the energy-absorbing pre-crush protector portion 64 is configured to shield the pelvic bolster portion 62.

Figure 8:
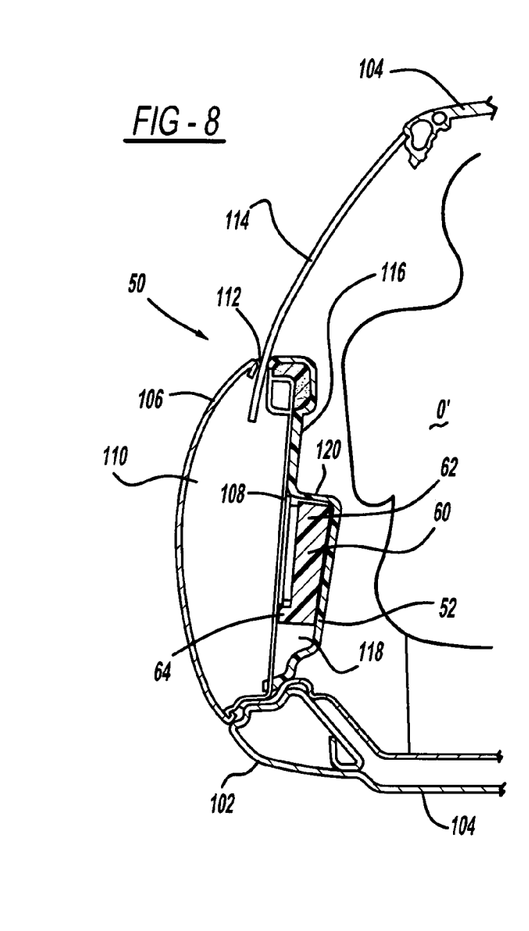
FIG. 8 illustrates a sectional view of a door assembly of the disclosed invention prior to an impact event.

FIG. 8 in general shows the door assembly of the disclosed invention prior to an impact event. FIGS. 9 through 12 show the same door assembly at progressive stages of an impact event.

With reference particularly to FIG. 8, a sectional view of the door assembly 50 shown and is illustrated at T1 or at a time prior at to an impact event. The door assembly 50 is illustrated in operational relationship with a rocker panel 102 of a vehicle 104. As is known the rocker panel 102 is stationary and connected to the structure of the vehicle 104 and the vehicle door 50 is movable and connected to the remaining structure of the vehicle 104 as is known in the art.

The vehicle door 50 includes an outer panel 106 and an inner door panel 108, joined together in conventional fashion to form a space 110 therebetween. The door trim substrate 52 is attached to the inner panel 108 by known methods. The door 50 also includes an aperture 112 at an upper end for receiving a window 114, which may move in and out of the space 110. As is the case with known vehicle door arrangements, a window regulator device, a door latch, a guard beam, and other components (not shown) of a vehicle door as known in the art may also be housed entirely or substantially within the space 110.

A door trim panel 116 is mounted on the inner panel 108 to form a space 118 therebetween. As is the case with known vehicle door arrangements, a window regulator device, a door latch, a guard beam, and other components (not shown) of a vehicle door as known in the art may also be housed entirely or substantially within the space 118. The door trim panel 116 includes an arm rest 120 generally facing the occupant seating area in which an occupant O' is seated. Preferably, the trim panel 116 is fixedly secured to the inner panel 108 by suitable fasteners (not shown) such as a screw and clip arrangement. Other fastening means may also be used, such as Christmas tree fasteners, push pins, or other fasteners known to those skilled in the art.

Preferably the outer panel 106 and the inner panel 108 are made of a metal material or other suitable material. The door trim panel 116 is made of a suitable material such as plastic, cloth, vinyl, leather, carpeting, cardboard, wood fiber, or a combination thereof.

The impact energy-absorbing construction 60 having the pelvic bolster portion 62 and the energy-absorbing pre-crush protector portion 64 is fitted to the door trim substrate 52. As noted above, preferably, but not absolutely, the door construction is integral with the door trim substrate 52. The pelvic bolster portion 62 and the energy-absorbing pre-crush protector portion 64 may be any of a variety of crush strengths, shapes and thicknesses as required for protection of the pelvis and leg regions of the occupant O'.

Figure 9:
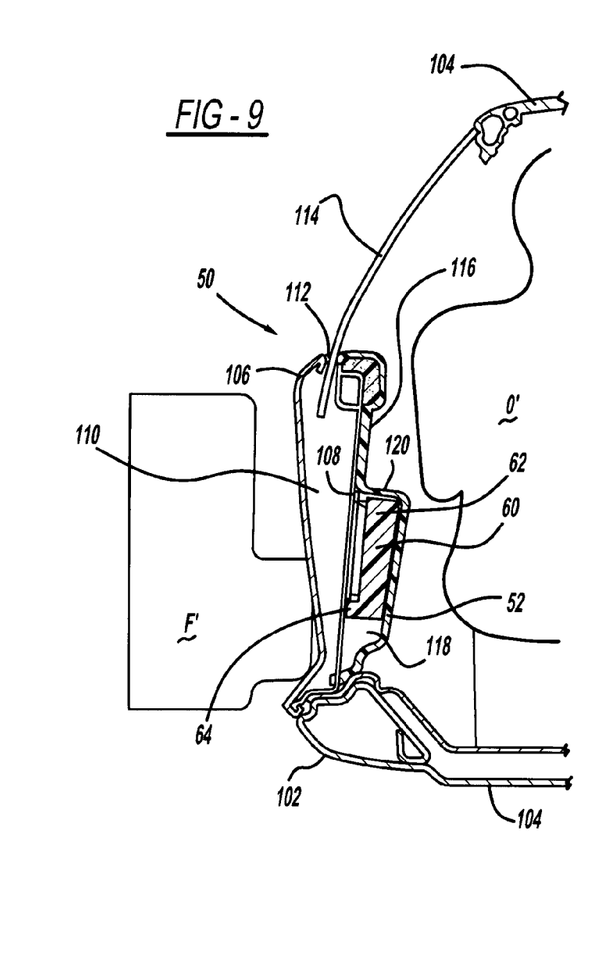
FIG. 9 illustrates a view of the door assembly of FIG. 8 but showing the assembly initially after an impact event.

FIG. 9 illustrates the early stages of an impact event. At this stage, T2, an impacting force, generally illustrated as F', presses the outer panel 106 vehicle-inward. At this stage of the impact event only the outer panel 106 is changed, while a vehicle occupant O' is not directly impacted.

Figure 10:
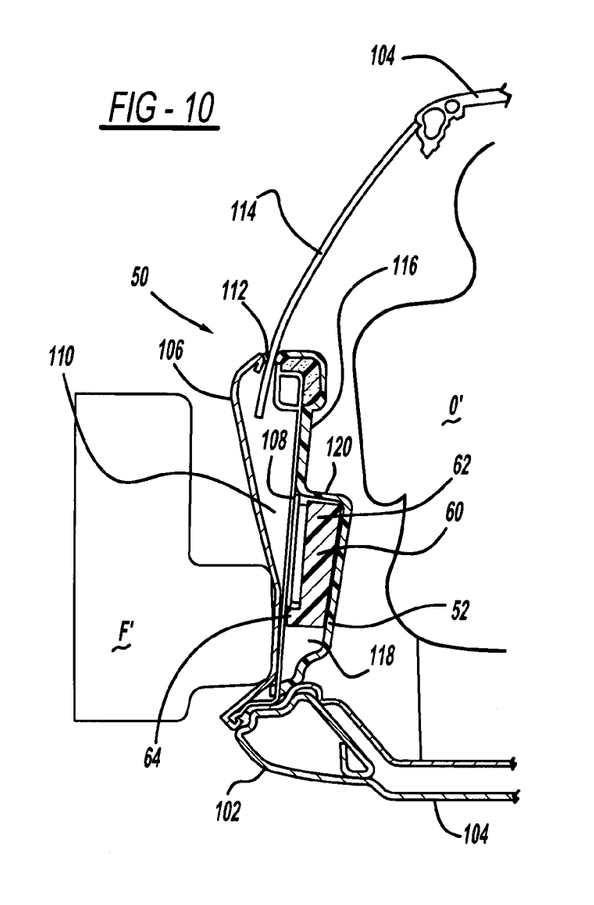
FIG. 10 illustrates a view of the door assembly of FIG. 9 but showing the assembly later after the impact event.

At T3, as shown in FIG. 10, the impacting force F' forces the outer panel 106 vehicle-inward substantially contacting and impacting upon the inner panel 108, which itself begins to deform.

Figure 11:
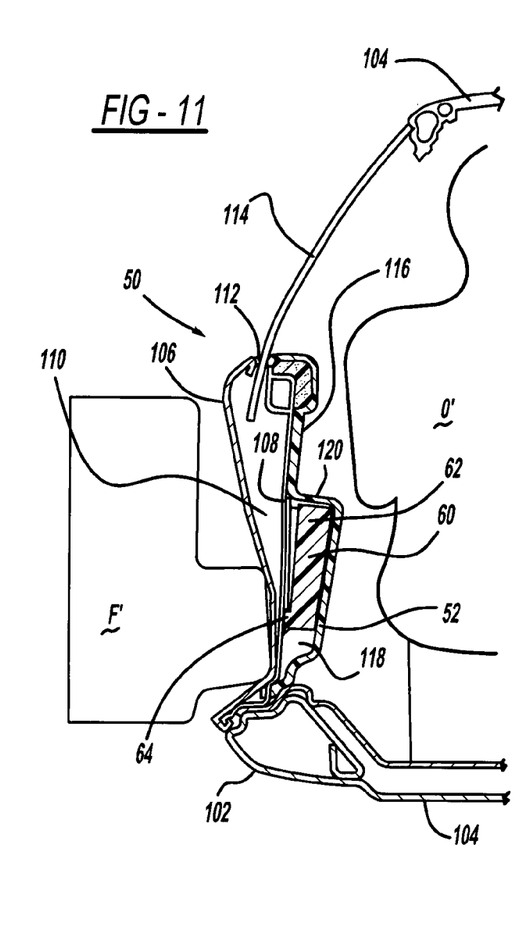
FIG. 11 illustrates a view of the door assembly of FIG. 10 but showing the assembly still later after the impact event.

FIG. 11 illustrates the impact event at T4 in which the impacting force F' has now moved both the outer panel 106 and the inner panel 108 vehicle-inward, impacting upon the impact energy-absorbing construction 60. As illustrated, only the energy-absorbing pre-crush protector portion 64 is being deformed as the energy-absorbing pre-crush protector portion 64 is directly constrained between the panels 106 and 108 and the door trim panel 116. The pelvic bolster portion 62 deforms only slightly, if at all, as the energy-absorbing pre-crush protector portion 64 is primarily and perhaps exclusively itself deformed.

Figure 12:
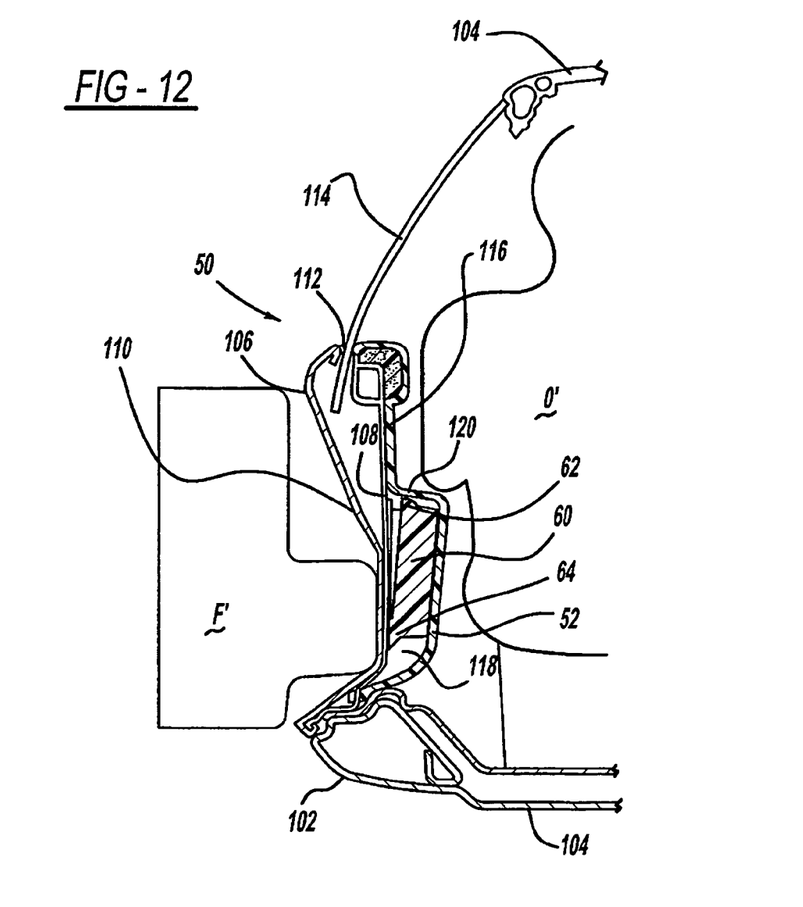
FIG. 12 illustrates a view of the door assembly of FIG. 11 but showing the assembly even later after the impact event.

As shown in FIG. 12, at T5 the impact energy-absorbing construction 60, having a substantially or entirely un-deformed pelvic bolster portion 62, spared being crushed by the sacrificial energy-absorbing pre-crush protector portion 64 of the construction 60, provides optimal occupant performance in a side impact. As illustrated in FIG. 12, the occupant O' receives proper and appropriate support upon a side impact event.

As illustrated in FIG. 7, the energy-absorbing pre-crush protection portion 64 is preferably of a rib cassette construction which is composed of a series of intersecting walls. However, other configurations of the energy-absorbing pre-crush protector portion may be of a variety of configurations as are illustrated in FIGS. 13 through 24. Preferably although not absolutely the protector portion illustrated in FIGS. 13 through 24 is composed of a polymerized material.

Figure 13:
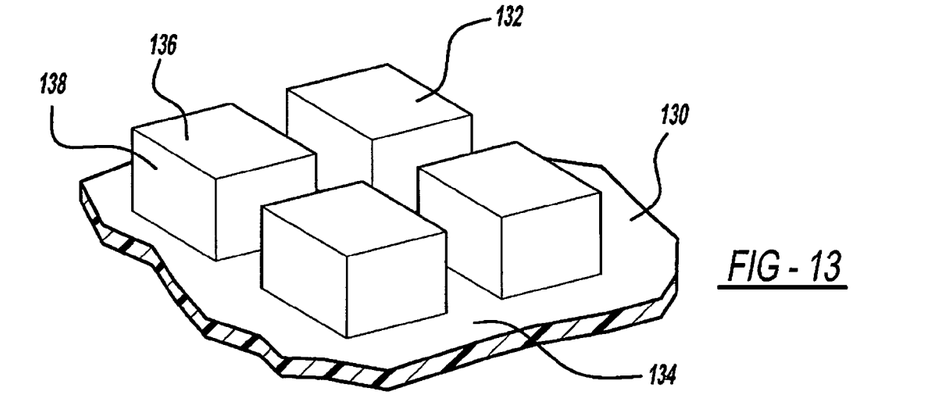
FIG. 13 illustrates a perspective view of a segment of the first alternate embodiment of the energy-absorbing pre-crush protector portion of the disclosed invention.

With reference to FIG. 13, a segment of an energy-absorbing pre-crush protector portion 130 is illustrated. The pre-crush protector portion 130 includes a plurality of crushable elements 132 formed on a base wall 134. Each crushable element 132 includes a top wall 136 and a plurality of upright side walls 138.

Figure 14:
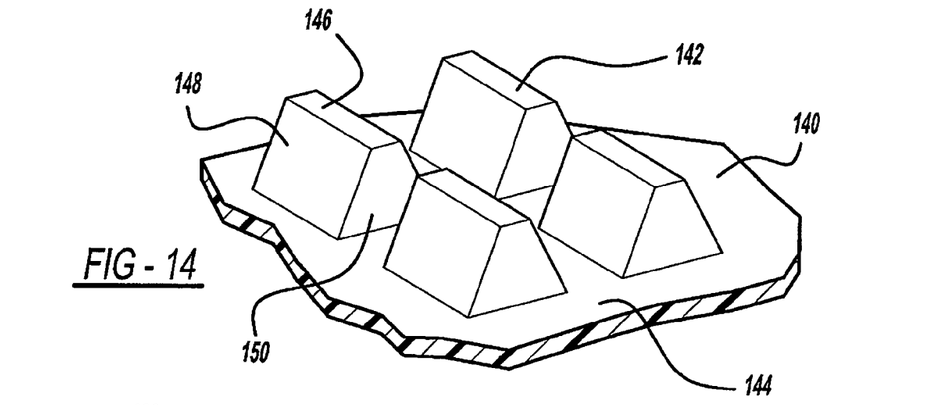
FIG. 14 illustrates a perspective view of a segment of the second alternate embodiment of the energy-absorbing pre-crush protector portion of the disclosed invention.

With reference to FIG. 14, a segment of an energy-absorbing pre-crush protector portion 140 is illustrated. The pre-crush protector portion 140 includes a plurality of crushable elements 142 formed on a base wall 144. Each crushable element 142 includes a top wall 146, a pair of opposed angled walls 148, and a pair of opposed upright walls 150.

Figure 15:
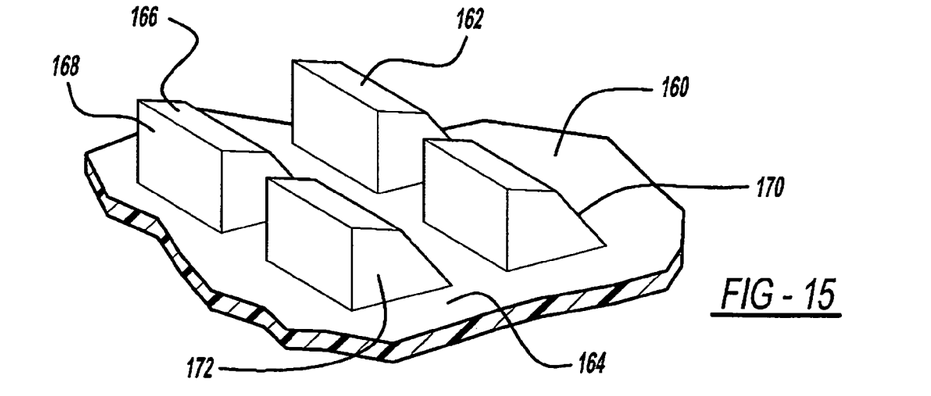
FIG. 15 illustrates a perspective view of a segment of the third alternate embodiment of the energy-absorbing pre-crush protector portion of the disclosed invention.

With reference to FIG. 15, a segment of an energy-absorbing pre-crush protector portion 160 is illustrated. The pre-crush protector portion 160 includes a plurality of crushable elements 162 formed on a base wall 164. Each crushable element 162 includes an elongated top wall 166, a first upright side wall 168, an angled side wall 170, and a pair of opposed upright end walls 172.

Figure 16:
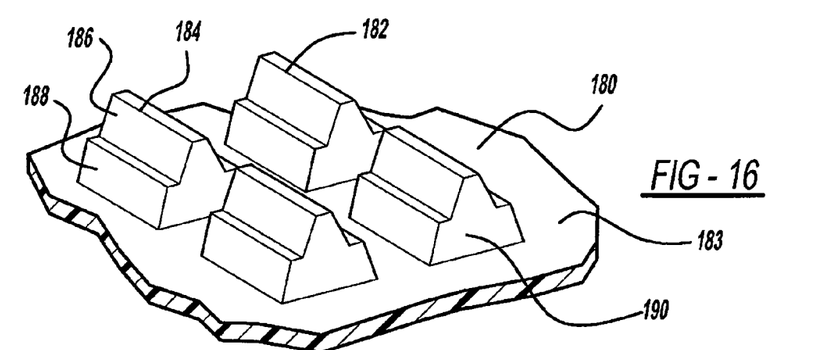
FIG. 16 illustrates a perspective view of a segment of the fourth alternate embodiment of the energy-absorbing pre-crush protector portion of the disclosed invention.

With reference to FIG. 16, a segment of an energy-absorbing pre-crush protector portion 180 is illustrated. The pre-crush protector portion 180 includes a plurality of crushable elements 182 formed on a base wall 183. Each crushable element 182 includes a top wall 184, a first pair of opposed angled walls 186, a second pair of opposed angled walls 188, and a pair of opposed upright walls 190.

Figure 17:
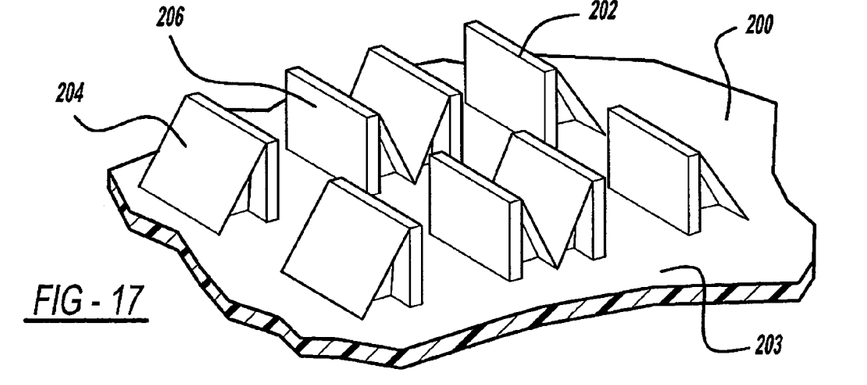
FIG. 17 illustrates a perspective view of a segment of the fifth alternate embodiment of the energy-absorbing pre-crush protector portion of the disclosed invention.
Figure 18:
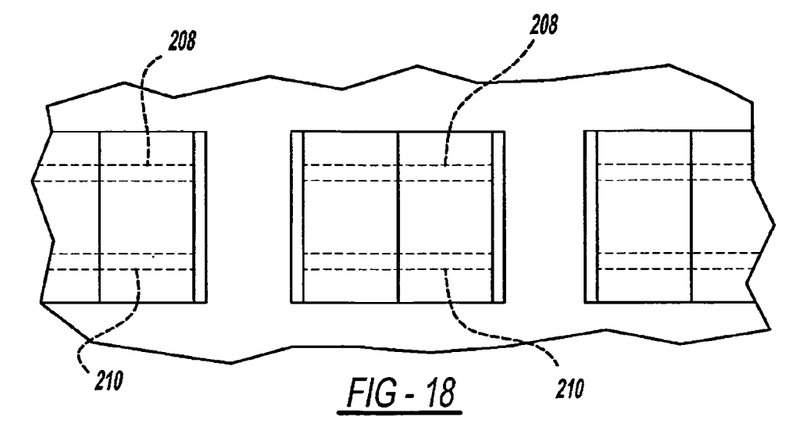
FIG. 18 illustrates a top plan view of the fifth alternate embodiment shown in FIG. 17.

With reference to FIGS. 17 and 18, a segment of an energy-absorbing pre-crush protector portion 200 is illustrated. The pre-crush protector portion 200 includes a plurality of crushable elements 202 formed on a base wall 203. Each crushable element 202 includes an angled sidewall 204 and an upright wall 206. As illustrated the upright wall 206 of one crushable element 202 is spaced apart from the upright wall 206 of an adjacent crushable element 202. A pair of spaced apart supporting walls 208 and 210 (shown in broken lines in FIG. 18) provides supplemental support to each crushable element 202. A greater or lesser number of supporting walls may be incorporated.

Figure 19:
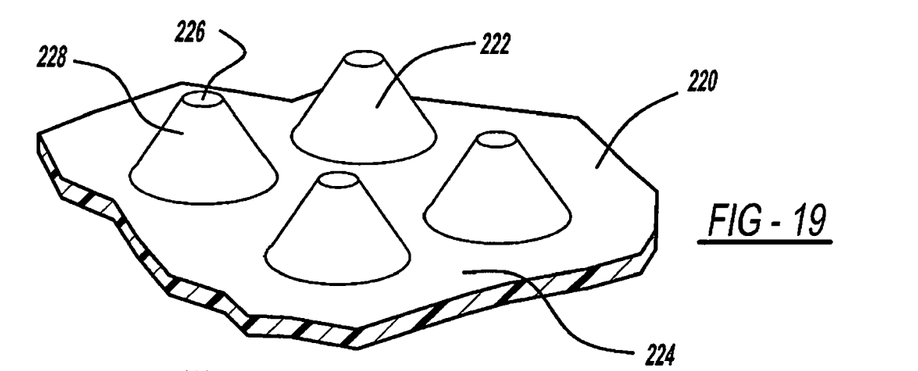
FIG. 19 illustrates a perspective view of a segment of the sixth alternate embodiment of the energy-absorbing pre-crush protector portion of the disclosed invention.

With reference to FIG. 19, a segment of an energy-absorbing pre-crush protector portion 220 is illustrated. The pre-crush protector portion 220 includes a plurality of crushable elements 222 formed on a base wall 224. Each crushable element 222 includes a substantially circular top wall 226 and a conical side wall 228.

Figure 20:
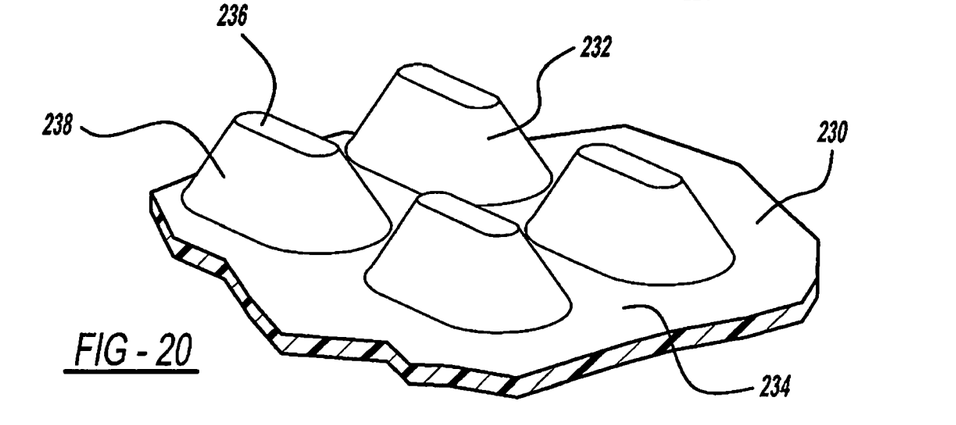
FIG. 20 illustrates a perspective view of a segment of the seventh alternate embodiment of the energy-absorbing pre-crush protector portion of the disclosed invention.

With reference to FIG. 20, a segment of an energy-absorbing pre-crush protector portion 230 is illustrated. The pre-crush protector portion 230 includes a plurality of crushable elements 232 formed on a base wall 234. Each crushable element 232 includes a substantially oval top wall 236 and an elongated conical side wall 238.

Figure 21:
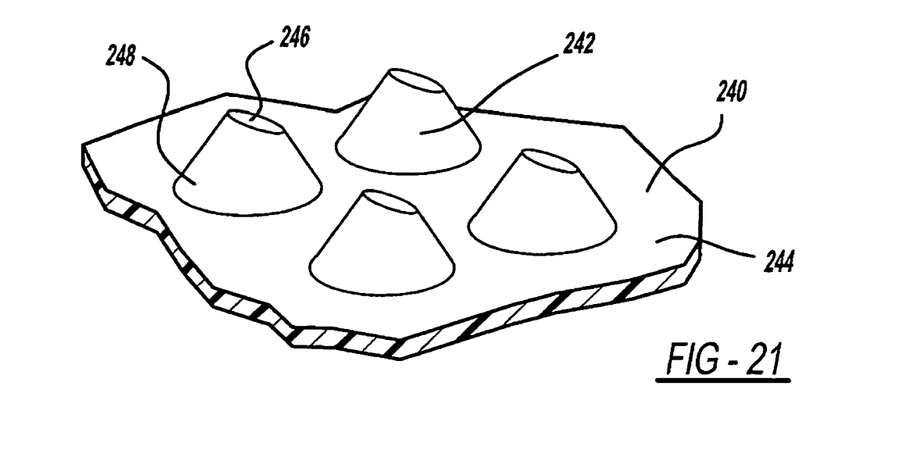
FIG. 21 illustrates a perspective view of a segment of the eighth alternate embodiment of the energy-absorbing pre-crush protector portion of the disclosed invention.

With reference to FIG. 21, a segment of an energy-absorbing pre-crush protector portion 240 is illustrated. The pre-crush protector portion 240 includes a plurality of crushable elements 242 formed on a base wall 244. Each crushable element 242 includes a substantially oval and angled top wall 246 and a conical side wall 248.

Figure 22:
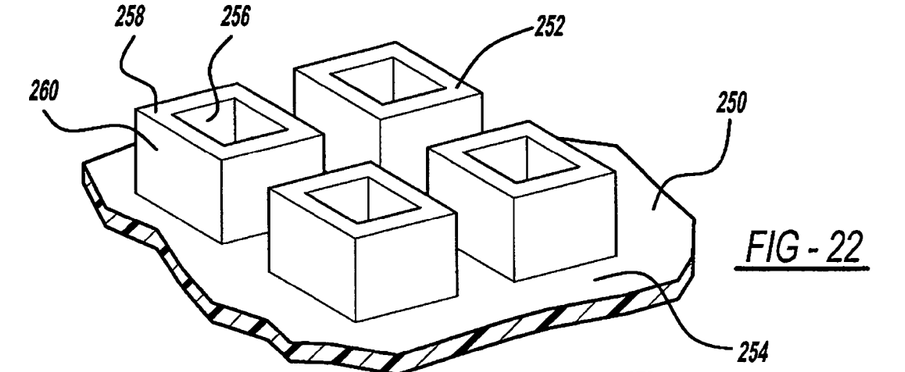
FIG. 22 illustrates a perspective view of a segment of the ninth alternate embodiment of the energy-absorbing pre-crush protector portion of the disclosed invention.

With reference to FIG. 22, a segment of an energy-absorbing pre-crush protector portion 250 is illustrated. The pre-crush protector portion 250 includes a plurality of crushable elements 252 formed on a base wall 254. Each crushable element 252 includes a plurality of like-shaped upright inner walls 356, a top wall 258, and a plurality of like-shaped upright outer walls 260.

Figure 23:
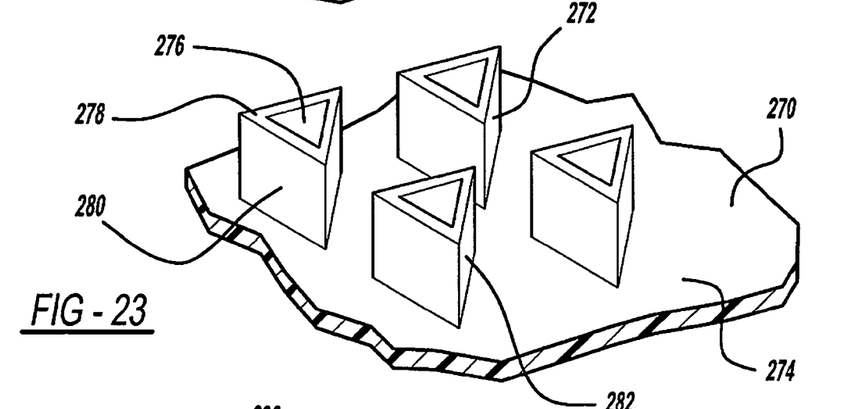
FIG. 23 illustrates a perspective view of a segment of the tenth alternate embodiment of the energy-absorbing pre-crush protector portion of the disclosed invention.

With reference to FIG. 23, a segment of an energy-absorbing pre-crush protector portion 270 is illustrated. The pre-crush protector portion 270 includes a plurality of crushable elements 272 formed on a base wall 274. Each crushable element 272 includes a plurality of inner walls 276, a top wall 278, a pair of like-shaped upright and adjacent walls 280, and an upright front wall 282.

Figure 24:
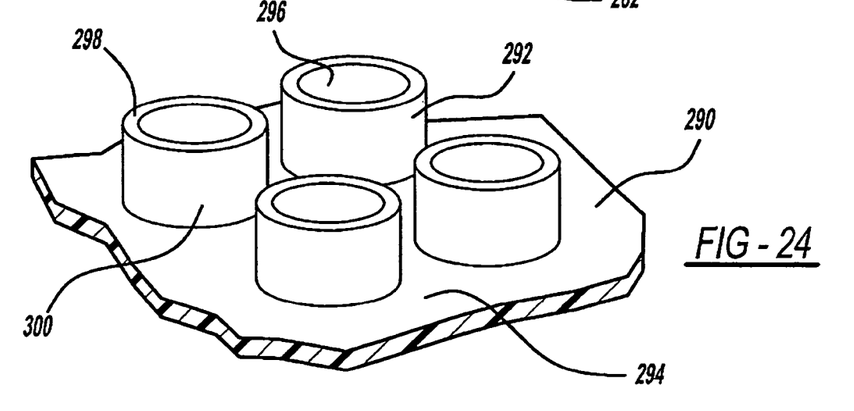
FIG. 24 illustrates a perspective view of a segment of the eleventh alternate embodiment of the energy-absorbing pre-crush protector portion of the disclosed invention.

With reference to FIG. 24, a segment of an energy-absorbing pre-crush protector portion 290 is illustrated. The pre-crush protector portion 290 includes a plurality of crushable elements 292 formed on a base wall 294. Each crushable element 292 includes a tubular configuration having an inner wall 296, a top wall 298, and an outer wall 300.

The foregoing discussion discloses and describes exemplary embodiments of the present invention. One skilled in the art will readily recognize from such discussion and from the accompanying drawings and claims that various changes, modifications and variations can be made therein without departing from the true spirit and fair scope of the invention as defined by the following claims.

A door trim substrate having a construction that includes, in combination, an energy-absorbing pre-crush protective portion and a pelvic bolster portion is provided for use in a vehicle. The pre-crush protective portion is configured to protect the pelvic bolster portion from pre-crush in a vehicle side-impact event. The pre-crush portion is defined by a rib cassette structure that is preferably integrally molded into the door trim substrate below the pelvic bolster.

What is claimed is:

1. A door assembly for use in a vehicle, the door assembly comprising:
   an outer panel;
   an inner door panel disposed adjacent said outer panel;
   a pelvic impact energy-absorbing construction disposed adjacent said inner door panel, said pelvic impact energy-absorbing construction having a pelvic bolster portion and a pre-crush protector portion extending vehicle-outward from said pelvic bolster portion, said bolster portion and said pre-crush protector portion being integral portions of said pelvic impact energy-absorbing construction.

2. The door assembly of claim 1, wherein said pelvic bolster portion 62 and said pre-crush protector portion are an integral construction.

3. The door assembly of claim 1, wherein said pelvic bolster portion 62 and said pre-crush protector portion are a molded component.

4. The door assembly of claim 1, wherein said pre-crush protector portion is composed of a plurality of intersecting walls.

5. The door assembly of claim 4, wherein said plurality of walls interconnect substantially at right angles.

6. A door assembly for use in a vehicle, the door assembly comprising:
   an outer panel;
   an inner door panel disposed adjacent said outer panel;
   a pelvic impact energy-absorbing construction disposed adjacent said inner door panel, said pelvic impact energy-absorbing construction having a pelvic bolster portion and a pre-crush protector portion, said pre-crush protector portion extending from said pelvic bolster portion, said pre-crush protector portion being composed of a plurality of intersecting walls, said bolster portion and said pre-crush protector portion being integral portions of said pelvic impact energy-absorbing construction.

7. The door assembly of claim 6, wherein said pelvic bolster portion and said pre-crush protection portion are an integral construction.

8. The door assembly of claim 6, wherein said pelvic bolster portion and said pre-crush protection portion are a molded component.

9. The door assembly of claim 6, wherein said plurality of walls interconnect substantially at right angles.

* * * * *